(12) United States Patent
Kort

(10) Patent No.: US 7,795,847 B2
(45) Date of Patent: Sep. 14, 2010

(54) POWER SUPPLY DEVICE, IN PARTICULAR FOR REDUNDANT OPERATION WITH A PLURALITY OF FURTHER POWER SUPPLY DEVICES CONNECTED IN PARALLEL ON THE OUTPUT SIDE

(75) Inventor: Valentin Kort, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 31 days.

(21) Appl. No.: 12/378,803

(22) Filed: Feb. 19, 2009

(65) Prior Publication Data

US 2009/0219738 A1 Sep. 3, 2009

(30) Foreign Application Priority Data

Feb. 21, 2008 (EP) .................................. 08003210

(51) Int. Cl.
*G05F 1/00* (2006.01)
(52) U.S. Cl. ........................................ 323/222; 323/266
(58) Field of Classification Search ................. 323/222, 323/266, 283; 363/101
See application file for complete search history.

(56) References Cited

U.S. PATENT DOCUMENTS 4,533,986 A * 8/1985 Jones .......................... 323/266

| | | |
|---|---|---|
| 5,801,931 A | 9/1998 | Kino et al. |
| 2003/0007376 A1 | 1/2003 | Brkovic |
| 2008/0055941 A1 | 3/2008 | Victor et al. |

FOREIGN PATENT DOCUMENTS

DE 19545360 A1 6/1996

* cited by examiner

*Primary Examiner*—Shawn Riley

(57) ABSTRACT

A power supply device has an input for an AC input voltage or for a DC input voltage and an output for a load-dependent DC output voltage electrically isolated therefrom. A step-up converter is connected to the input side, a charging coil, a first switching element, a freewheeling diode, a charging capacitor and means for regulating the voltage of a converter DC input voltage are provided on the output side at the step-up converter unit by a pulse-width-modulated activation of the first switching element. The power supply device has a switched-mode DC/DC converter connected to the step-up converter unit, a second switching element with a transformer for electrical isolation, and means for closed-loop controlled predefined, load-dependent voltage reduction of the DC output voltage by pulse-width-modulated activation. The second switching element is controlled by a constant converter pulse duty factor. The first switching element is controlled by a converter pulse duty factor such that the converter DC input voltage decreases with increasing load.

14 Claims, 4 Drawing Sheets

POWER SUPPLY DEVICE, IN PARTICULAR FOR REDUNDANT OPERATION WITH A PLURALITY OF FURTHER POWER SUPPLY DEVICES CONNECTED IN PARALLEL ON THE OUTPUT SIDE

CROSS REFERENCE TO RELATED APPLICATIONS

This application claims priority of European Patent application No. 08003210.5 EP filed Feb. 21, 2008, which is incorporated by reference herein in its entirety.

FIELD OF INVENTION

The invention relates to a power supply device having an input for an AC input voltage or for a DC input voltage derived from the latter, as well as to an output for a load-dependent DC output voltage electrically isolated therefrom. Connected on the input side the power supply device has a step-up converter unit having a charging coil, a first switching element, a freewheeling diode, a charging capacitor and means for regulating a converter DC input voltage provided on the output side at the step-up converter unit by means of a pulse-width-modulated activation of the first switching element. The power supply device additionally has a switched-mode DC/DC converter connected downstream of the step-up converter unit and having at least one second switching element, having a transformer for electrical isolation and having means for closed-loop controlled predefined, load-dependent voltage reduction of the DC output voltage by means of a pulse-width-modulated activation of the second switching element.

BACKGROUND OF INVENTION

Power supply devices of the aforesaid kind are generally known. They are used to convert an input voltage by means of a transformer into an output voltage electrically isolated therefrom. The input voltage can be e.g. a rectified line voltage or AC input voltage of a 50 Hz/230V or a 60 Hz/120V power supply network of a public utility company. The DC output voltage can lie in a voltage range of 1 V to 48 V. For automation applications it lies in particular in a voltage range of 15 V to 24 V.

The power supply devices under consideration have a load-dependent DC output voltage. In other words the closed-loop controlled DC output voltage decreases as the electrical load increases, i.e. as the output current increases. What is achieved by this means is that in particular similar power supply devices and power supply devices collectively feeding into a bus cable or busbar in accordance with a load distribution scheme are approximately equally loaded. Parallel infeeding is necessary in particular when the connected loads, such as e.g. automation components or system parts, are to continue operating without interruption in the event of failure of one of the power supply devices.

The voltage reduction can be taken into account in a closed-loop control system by suitable feedback of an output current value measured by means of a current measuring unit. Typically the DC output voltage, starting from a no-load voltage value, returns in a linear manner to a rated load voltage value at a rated output current. In the event of further loading of the power supply device in the sense of an overload or a short-circuit, the output current can be limited to the rated current.

The power supply devices under consideration are preferably designed as two-stage entities. The first stage is typically a step-up converter unit, which is preferably operated in a PFC (Power Factor Correction) operating mode. The second stage is a DC/DC converter, which converts the input voltage in an electrically isolated manner into the desired DC output voltage. Basically, different circuit topologies can be drawn upon for building the DC/DC converter. Thus, for example, the DC/DC converter can have a flyback converter, a forward converter, a push-pull converter, a resonant converter or the like. Depending on circuit topology and space requirements, the efficiency of a DC/DC converter of said type can be very different. As a general rule it holds that efficiency is at a maximum in a relatively narrow operating range of the DC/DC converter. In this case the pulse duty factor of a pulse-width-modulated switching element, in particular a switching transistor, plays a critical role. The pulse duty factor is in this case determined by the input voltage of the DC/DC converter, its output voltage and the transformation ratio of the transformer. For the considered power supply devices having what is termed a "soft" characteristic curve, i.e. having a load-dependent DC output voltage, this means that high efficiency values are only attained in a small part of the entire load range. The cause of this is the transformation losses of the transformer which are heavily dependent on the pulse duty factor.

In order to alleviate this problem it is known to over-dimension the DC/DC converter of the power supply device so as to achieve a higher efficiency overall.

SUMMARY OF INVENTION

Disadvantageous aspects thereof are the associated increase in packaging size and the higher manufacturing costs for a power supply device of said kind.

It is therefore an object of the invention to disclose a power supply device which has comparatively high efficiency values over a wide load range.

The object is achieved by means of a power supply device having the features as claimed in the independent claim. Advantageous embodiments are set forth in the dependent claims.

The second switching element of the DC/DC converter can be controlled by means of a constant converter pulse duty factor. The first switching element can be controlled by means of a converter pulse duty factor such that the converter DC input voltage decreases, in particular proportionally, with increasing load. As a result the entire power supply device advantageously has a maximum and practically constant level of efficiency over virtually the entire load range by comparison with the prior art.

Preferably the DC output voltage can be reduced linearly from a no-load voltage value to a rated load voltage value, with the result that all the collectively infeeding power supply devices are approximately equally loaded.

The fundamental concept of the present invention is that, starting from the basis of a pulse duty factor of the DC/DC converter with a maximal possible efficiency, the pulse duty factor of the step-up converter unit, not the pulse duty factor of the DC/DC converter, is modified in order to reduce the load-dependent DC output voltage.

For illustration purposes the transformation equation of a forward converter which can be used as a DC/DC converter for a power supply device will be considered below. In this case the following applies:

$$U_{OUT} = T \cdot U_{IN} / \ddot{U},$$

where
$U_{OUT}$ is the output voltage,
$U_{IN}$ is the input voltage,
Ü is the constant transformation ratio of the transformer, and
T is the pulse duty factor of the forward converter's switching element that is clocked on the primary side.

As the transformation equation of the forward converter shows, the output voltage $U_{OUT}$ is directly proportional to the input voltage $U_{IN}$ when the pulse duty factor T is constant or remains constant. Thus it is also possible to regulate the output voltage by way of a regulation of the input voltage $U_{IN}$ for the forward converter or generally for the DC/DC converter. The input voltage $U_{EIN}$ is thus regulated by changing the pulse duty factor of the upstream-connected step-up converter unit. In this case the efficiency of the step-up converter unit is essentially independent of the pulse duty factor of the first switching element owing to the absence of the lossy transformer in the step-up converter unit, i.e. is essentially maximal over the entire load range.

According to a particularly advantageous embodiment, at least a proportional share of the converter DC input voltage or of a converter input current is fed back in a weighted manner into a closed loop of the step-up converter unit. As a result an extremely simple wiring configuration of the voltage regulation means of the step-up converter unit is possible. In this case an electrically isolated feedback of the DC/DC-side DC output voltage into the step-up converter-side closed loop that would otherwise be necessary, such as e.g. by means of an optocoupler, is not required.

According to a further embodiment of the invention, the load-dependent reduction can preferably be predefined in a range from 10% to 25%. This enables a power supply device to have, for example, a no-load voltage value of 15 V and a rated load voltage value of 13 V, to which the DC output voltage then drops as the load increases.

According to an advantageous embodiment, a rectifier for rectifying the AC input voltage present at the input into the rectified DC input voltage is connected upstream of the step-up converter unit. If a power supply device of said kind has a rectifier of said kind, such as e.g. a diode or a bridge rectifier, this can be operated directly from a line voltage of a public power supply network. In this case the power supply device can also be regarded as a power section.

According to one embodiment, the rectifier and the step-up converter unit connected downstream thereof are embodied for values of the AC input voltage in a range from 85 V to 260 V.

According to a further embodiment, the step-up converter unit is embodied for a DC input voltage of up to 400 V present at the input. In particular a (constant) DC input voltage, such as e.g. 24 V or 48 V, can be applied to the input of the power supply device.

As a result the power supply device can be operated at the principal line voltages, in particular from a 230V or 120V power supply network, without need for changeover measures.

According to a further embodiment, the DC output voltage can be predefined in a voltage range of 1 V to 48 V. This means that e.g. automation components, control devices and the like can be supplied directly with the DC output voltage.

In particular the DC/DC converter has a flyback converter, a forward converter, a push-pull converter, a resonant converter or the like. Converters of this type are generally known. A characteristic common to them all is that at a predefined constant pulse duty factor their efficiency is approximately constant over practically the entire load range.

BRIEF DESCRIPTION OF THE DRAWINGS

The invention and advantageous embodiments of the invention are described in more detail below with reference to the accompanying figures, in which.

DETAILED DESCRIPTION OF INVENTION

Figure 1:
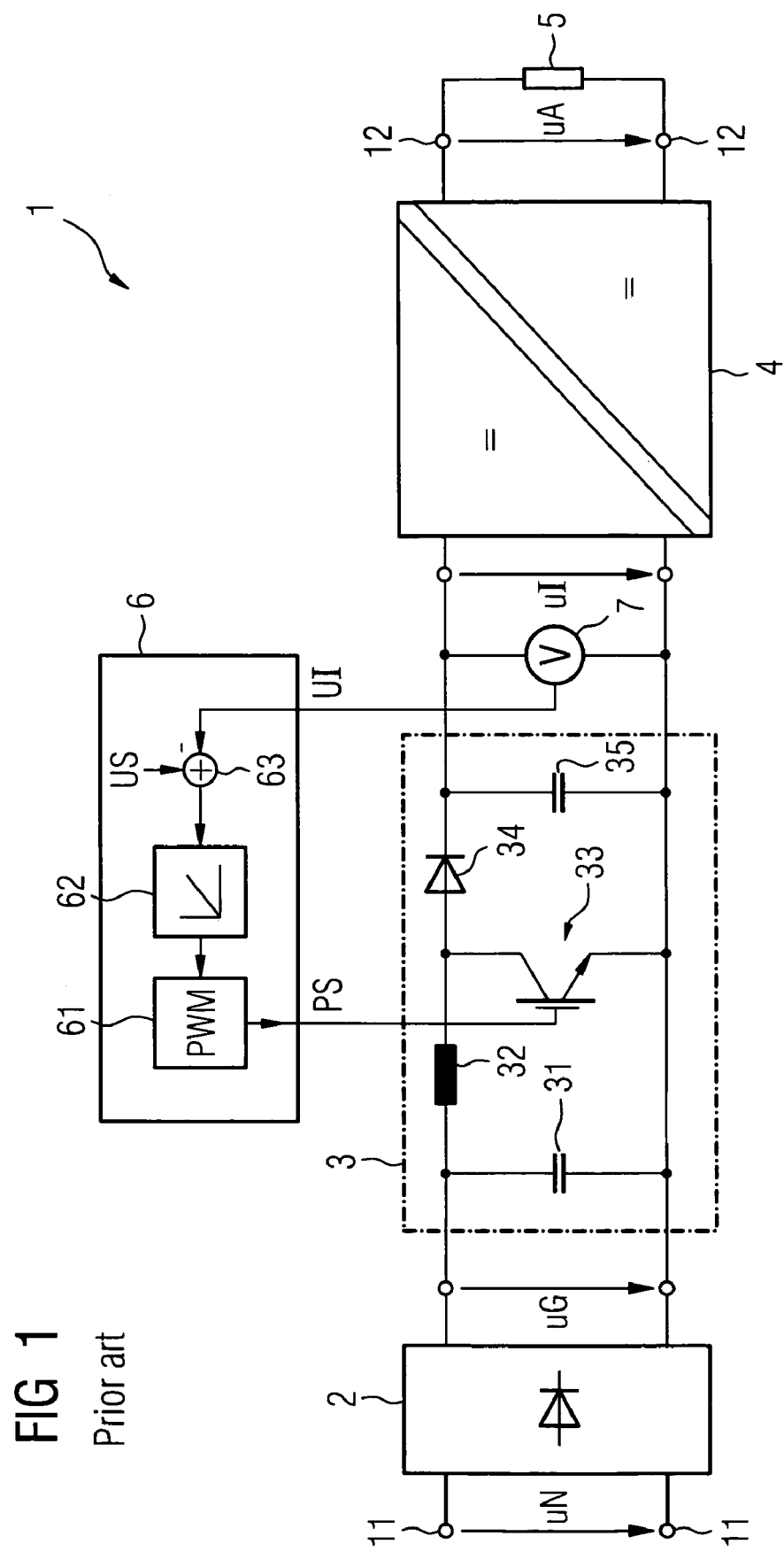
FIG. 1 shows a circuit diagram of an exemplary power supply device having a step-up converter unit and a downstream-connected DC/DC converter according to the prior art.

FIG. 1 shows a circuit diagram of an exemplary power supply device 1 having a step-up converter unit 3 and a downstream-connected DC/DC converter 4 according to the prior art.

In the left-hand part of FIG. 1, the power supply device 1 shown already has a rectifier 2 for rectifying an AC input voltage uN present at an input 11 into a DC input voltage uG. Connected downstream of the rectifier 2 in a known manner is a step-up converter unit 3 which converts the rectified DC input voltage uG on the output side into a converter DC input voltage uI. In the input area, the step-up converter unit 3 also has a buffer capacitor 31 for smoothing the pulsed DC input voltage uG, as well as a charging coil 32, a freewheeling diode 34, a charging capacitor 35 and a switching transistor as the first switching element 33. The switching transistor 33 can be e.g. a MOSFET transistor or an IGBT transistor.

Connected downstream of the step-up converter unit 3 is a DC/DC converter 4 which converts the converter DC input voltage uI into a DC output voltage uA. The output of the power supply device 1 is identified by the reference numeral 12. An electrical load 5, symbolized by the circuit symbol for a resistor, is connected to said output 12. Alternatively it is also possible for a plurality of power supply devices 1 to feed collectively into the same load 5, preferably by way of a common bus cable or busbar.

For the purpose of regulating the respective voltages the power supply device 1 has a control unit 6 as regulating means. Said control unit can be a microcontroller. Alternatively it can be realized using conventional electronic components. The control unit 6 has a pulse width modulator 61 which outputs a digital trigger signal PS for a control electrode of the first switching element 33 on the output side. On the input side, the pulse width modulator 61 is supplied with a control signal (not identified further) of a controller 62. Said signal is output by a comparator 63 which compares a predefinable constant voltage reference value US for the DC/DC converter 4 with a converter input voltage measured value UI measured by means of a voltage measuring unit 7. By means of the closed loop shown, a controlled setting of the converter DC input voltage uI is possible by modifying the converter pulse duty factor in the pulse-width-modulated trigger signal PS. For the purpose of a load-dependent reduction in the DC output voltage uA, the DC/DC converter 4 can have feedback means (not shown further) in order e.g. to feed back a load current measured value into the closed-loop control circuit of the DC/DC converter 4.

Figure 2:
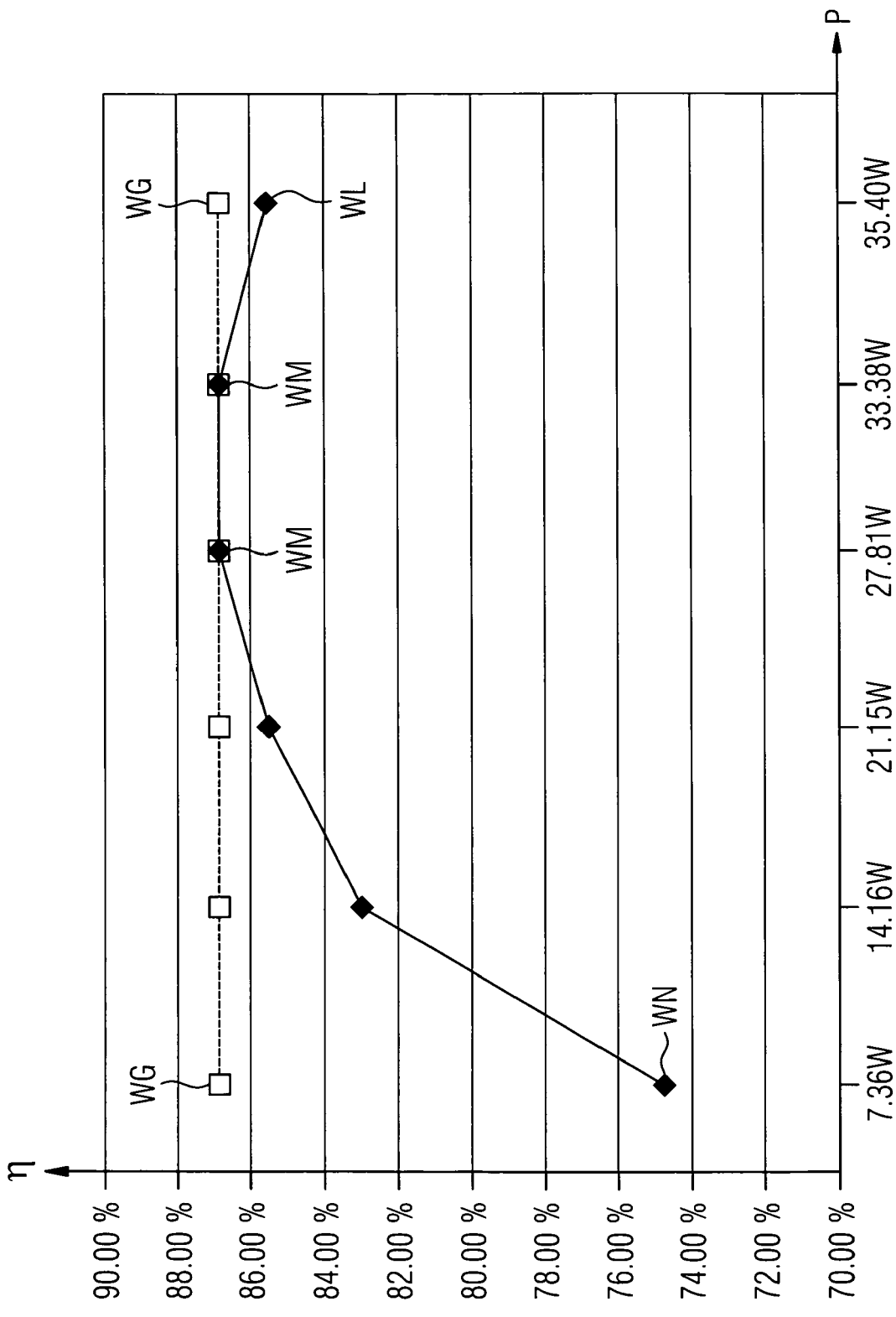
FIG. 2 shows a diagram containing efficiency values entered as a function of the loading of a DC/DC converter.

FIG. 2 shows a diagram containing efficiency values entered as a function of the loading of a DC/DC converter 4.

The electrical output power is identified by P, the efficiency of the DC/DC converter 4 by the Greek letter η. The DC/DC converter 4 of the power supply device 1 has, by way of example, a rated output power of approx. 35 W. As FIG. 2 also shows, the DC/DC converter 4 has a comparatively poor efficiency value WN of only approx. 75% when subject to a small load, such as e.g. 7.36 W. Only at medium to high output power does the DC/DC converter 4 exhibit acceptable high efficiency values WM of approx. 87%. Under further loading, on the other hand, the efficiency η drops to an efficiency value WL of approx. 85.5% at maximum load.

Desired efficiency values WG that remain the same over a wide load range of the DC/DC converter 4 are indicated by dashed lines in the drawing.

Figure 3:
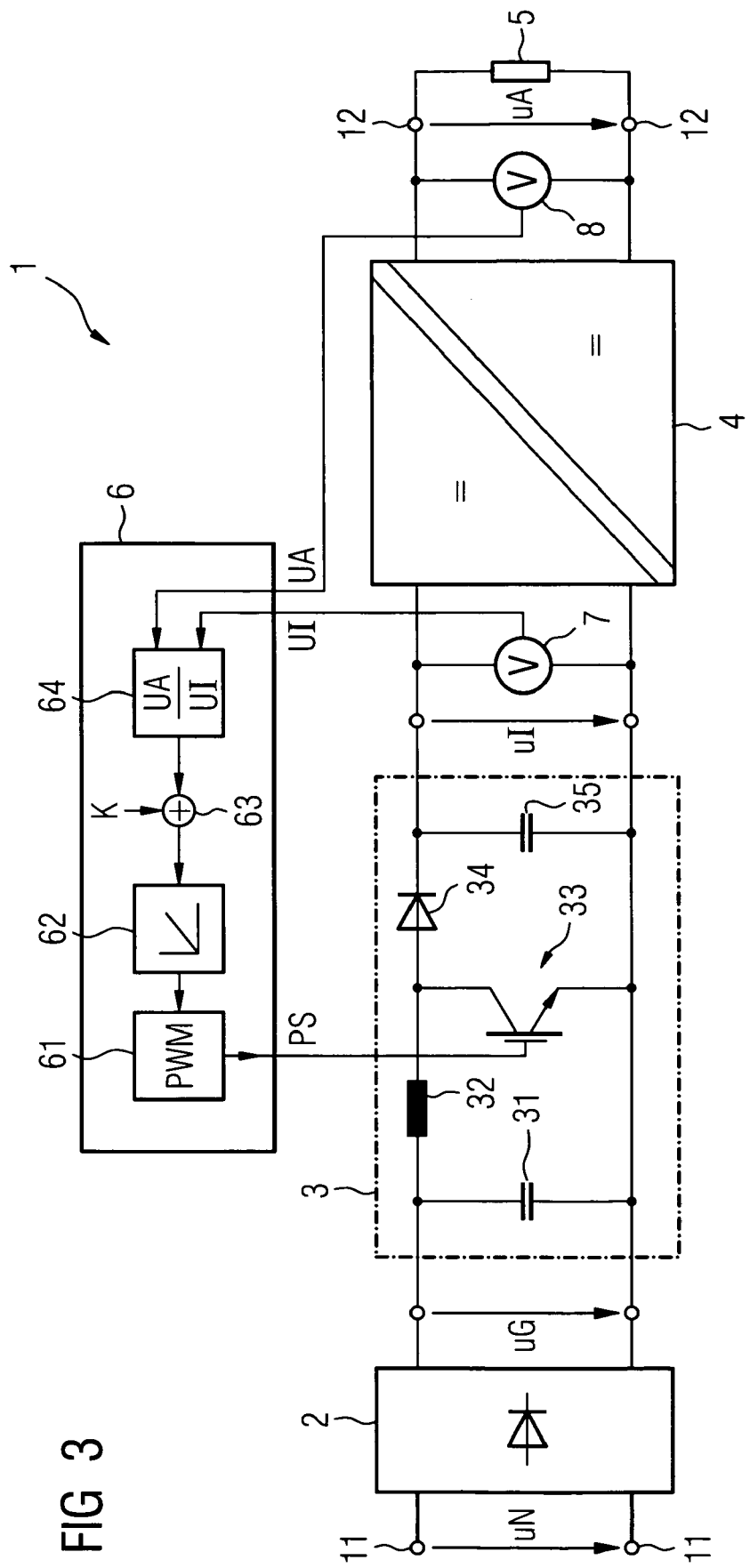
FIG. 3 shows a circuit diagram of an exemplary power supply device according to the invention.

FIG. 3 shows a circuit diagram of an exemplary power supply device 1 according to the invention. The second switching element of the DC/DC converter 4 can now be controlled by means of a constant converter pulse duty factor. The second switching element itself is not shown in FIG. 3. However, it is generally known that depending on circuit topology, a DC/DC converter 4 can typically have a second switching element or even two second switching elements which can be controlled in push-pull mode.

Furthermore, in order to control the first switching element 33, the converter pulse duty factor of the step-up converter unit 3 can be controlled in such a way that the ratio of DC output voltage uA to converter DC input voltage uI is essentially constant. In the present example the voltage regulation means of the converter DC input voltage uI provided on the output side at the step-up converter unit 3 are in turn realized by means of the control unit identified by the reference numeral 6. Analogously to the example of FIG. 1, said control unit has a pulse width modulator 61 and the upstream-connected controller 62. Connected upstream of the controller 62 in turn is a comparator 63 which now compares a constant predefinable value K with the result of a quotient construction UA:UI. The quotient is formed for example using a divider 64 which is supplied on the input side with a converter input voltage measured value UI and an output voltage measured value UA. Preferably the two measured values UI, UA each originate from a voltage measuring unit 7, 8.

In the steady state the value of the constant K and the quotient value UA:UA are essentially identical. If the DC output voltage uA now drops at the output 12 of the DC/DC converter 4 as a result of an increasing load, the value of the quotient UA:UI formed by the divider 64 also falls accordingly. The lower quotient value UA:UI is supplied to the following comparator 63. The comparison result supplied to the controller 62 is now likewise less and causes the latter to output a smaller converter pulse duty factor to the pulse width modulator 61. The output-side pulse-width-modulated trigger signal PS now controls the first switching element 33 in such a way that a smaller load current flows into the charging capacitor 35 and as a result the converter DC input voltage uI present there drops. This causes a constant ratio of DC output voltage uA to converter DC input voltage uI to become established again already after a short correction time.

The closed-loop control circuit shown can be simulated e.g. by means of a software routine on a microcontroller as the control unit 6. Alternatively the means for regulating the converter DC input voltage uI can be realized using analog components such operational amplifiers, transistors and the like.

Figure 4:
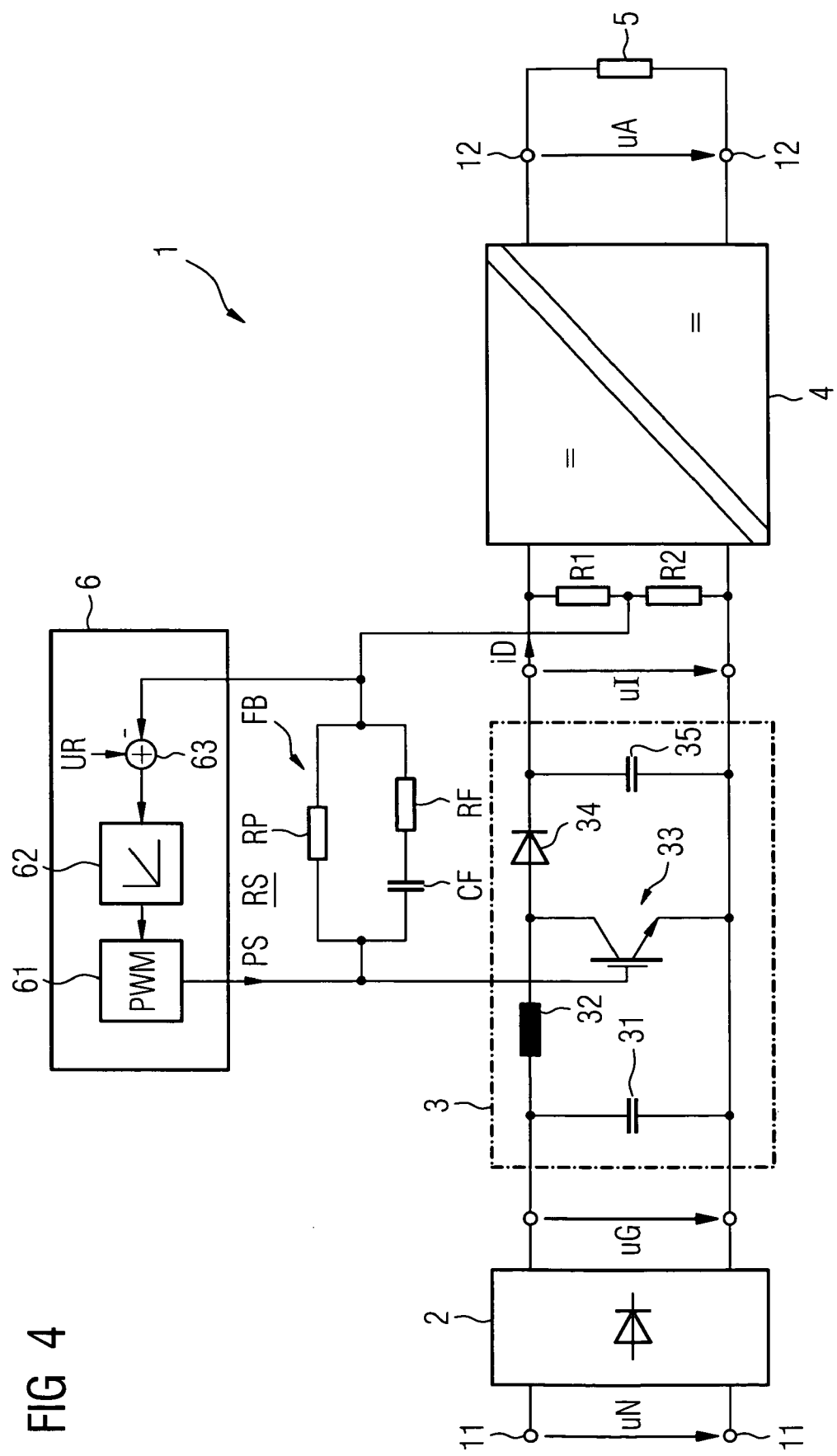
FIG. 4 shows a circuit diagram of an exemplary power supply device according to the invention in a particularly advantageous embodiment.

FIG. 4 shows a circuit diagram of an exemplary power supply device 1 according to the invention in a particularly advantageous embodiment.

In this case a voltage divider R1, R2 is used to supply a proportional voltage value of the converter DC input voltage uI to the comparator 63, which compares said voltage value with a reference voltage value UR. Alternatively a proportional current value of the converter input current iD could also be evaluated for measuring the load. In order now to achieve a load-dependent reduction in the converter DC input voltage uI, the latter or, as the case may be, a proportional voltage value is fed back in a weighted manner into a closed loop RS of the step-up converter unit 3. In this case FB designates a feedback element which is formed from a series circuit consisting of a filter capacitor CF and a filter resistor RF as well as a shunt resistor RP arranged relative thereto.

Referring to FIG. 4, the slope from a maximum converter DC input voltage in the unloaded state to a minimum converter DC input voltage at rated load can be set by corresponding dimensioning of the resistors RP, RF. In other words, in this case a reduction in the resistance value of the shunt resistor RP leads to a higher weighting of the feedback and consequently to a greater reduction in the converter DC input voltage uI with increasing load.

The invention claimed is:

1. A power supply device, comprising:
   an input for an AC input voltage or for a DC input voltage derived from the AC input voltage;
   an output for a load-dependent DC output voltage electrically isolated from the input voltage;
   a step-up converter unit connected on an input side having a charging coil, a first switching element, a freewheeling diode, a charging capacitor and a device for regulating the voltage of a converter DC input voltage provided on an output side at the step-up converter unit by a pulse-width-modulated activation of the first switching element;
   a switched-mode DC/DC converter connected downstream of the step-up converter unit having at least one second switching element, having a transformer for electrical isolation and having means for closed-loop controlled predefined, load-dependent voltage reduction of the DC output voltage by a pulse-width-modulated activation of the second switching element, wherein the second switching element is controlled by a constant converter pulse duty factor and the first switching element is controlled by a converter pulse duty factor such that the converter DC input voltage decreases with increasing load.

2. The power supply device as claimed in claim 1, wherein the power supply device is for redundant operation with a plurality of further power supply devices connected in parallel on an output side.

3. The power supply device as claimed in claim 1, wherein the first switching element is controlled such that the ratio of DC output voltage to converter DC input voltage is essentially constant.

4. The power supply device as claimed in claim 1, wherein at least a proportional share of the converter DC input voltage or of a converter input current is fed back in a weighted manner into a closed loop of the step-up converter unit.

5. The power supply device as claimed in claim 3, wherein at least a proportional share of the converter DC input voltage or of a converter input current is fed back in a weighted manner into a closed loop of the step-up converter unit.

6. The power supply device as claimed in claim 1, wherein the load-dependent reduction is predefined in a range of 10% to 25%.

7. The power supply device as claimed in claim 1, wherein a rectifier for rectifying the AC input voltage present at the input into the rectified DC input voltage is connected upstream of the step-up converter unit.

8. The power supply device as claimed in claim 3, wherein a rectifier for rectifying the AC input voltage present at the input into the rectified DC input voltage is connected upstream of the step-up converter unit.

9. The power supply device as claimed in claim 4, wherein a rectifier for rectifying the AC input voltage present at the input into the rectified DC input voltage is connected upstream of the step-up converter unit.

10. The power supply device as claimed in claim 5, wherein a rectifier for rectifying the AC input voltage present at the input into the rectified DC input voltage is connected upstream of the step-up converter unit.

11. The power supply device as claimed in claim 7, wherein the rectifier and the step-up converter unit connected downstream thereof are embodied for voltage values of the AC input voltage in a range from 85 V to 260 V.

12. The power supply device as claimed in claim 1, wherein the step-up converter unit is embodied for a DC input voltage of up to 400 V present at the input.

13. The power supply device as claimed in claim 1, wherein the DC output voltage is predefined in a voltage range from 1 V to 48 V.

14. The power supply device as claimed in claim 1, wherein the DC/DC converter has a flyback converter, a forward converter, a push-pull converter, a resonant converter or the like.

* * * * *